Dec. 28, 1948.  R. A. GIFFORD  2,457,655
HYDRAULIC SCALE MECHANISM
Filed Sept. 25, 1943  2 Sheets-Sheet 1
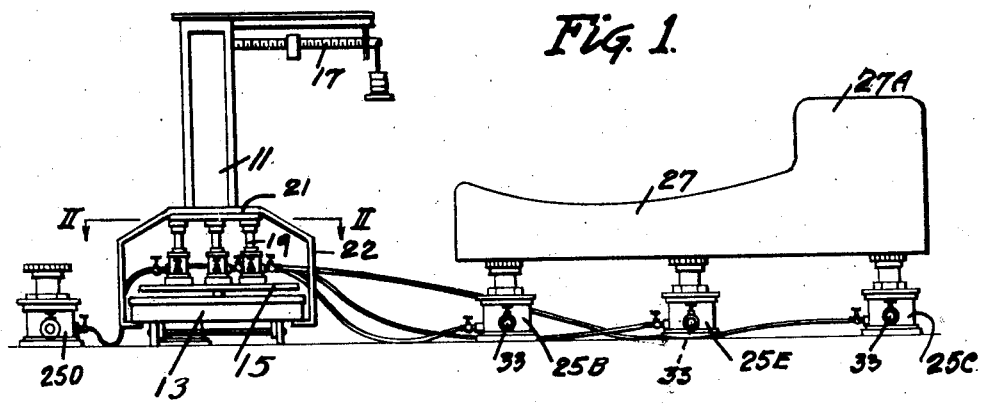
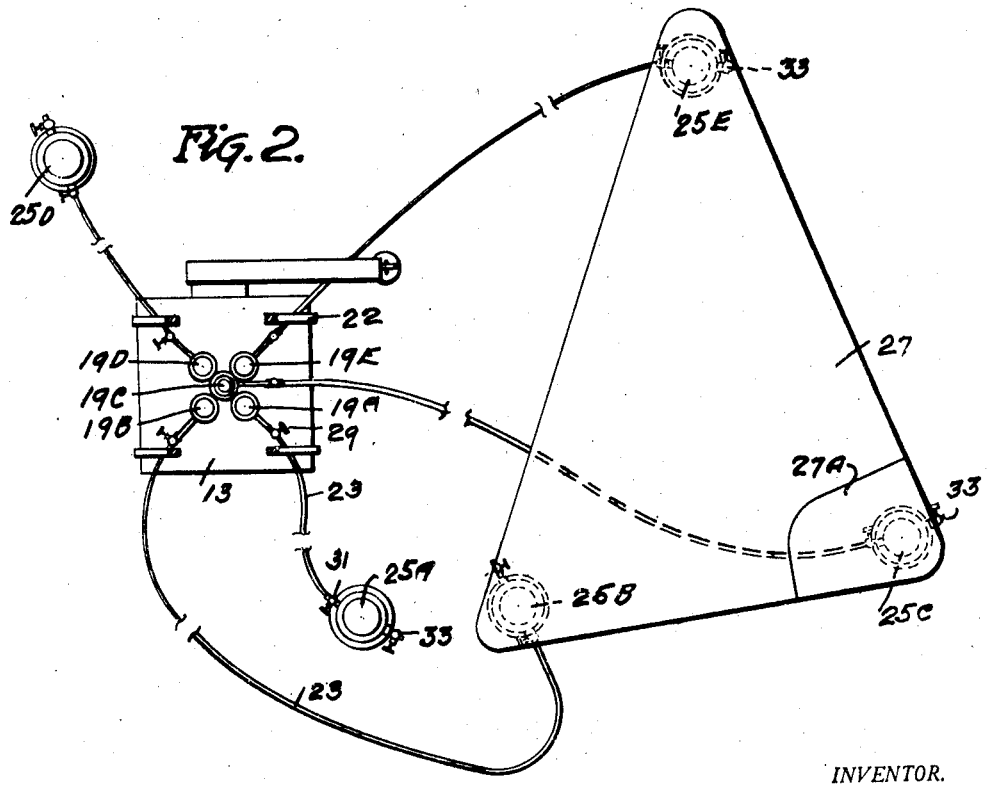
INVENTOR.
ROBERT A. GIFFORD
BY J. H. Weatherford
atty.

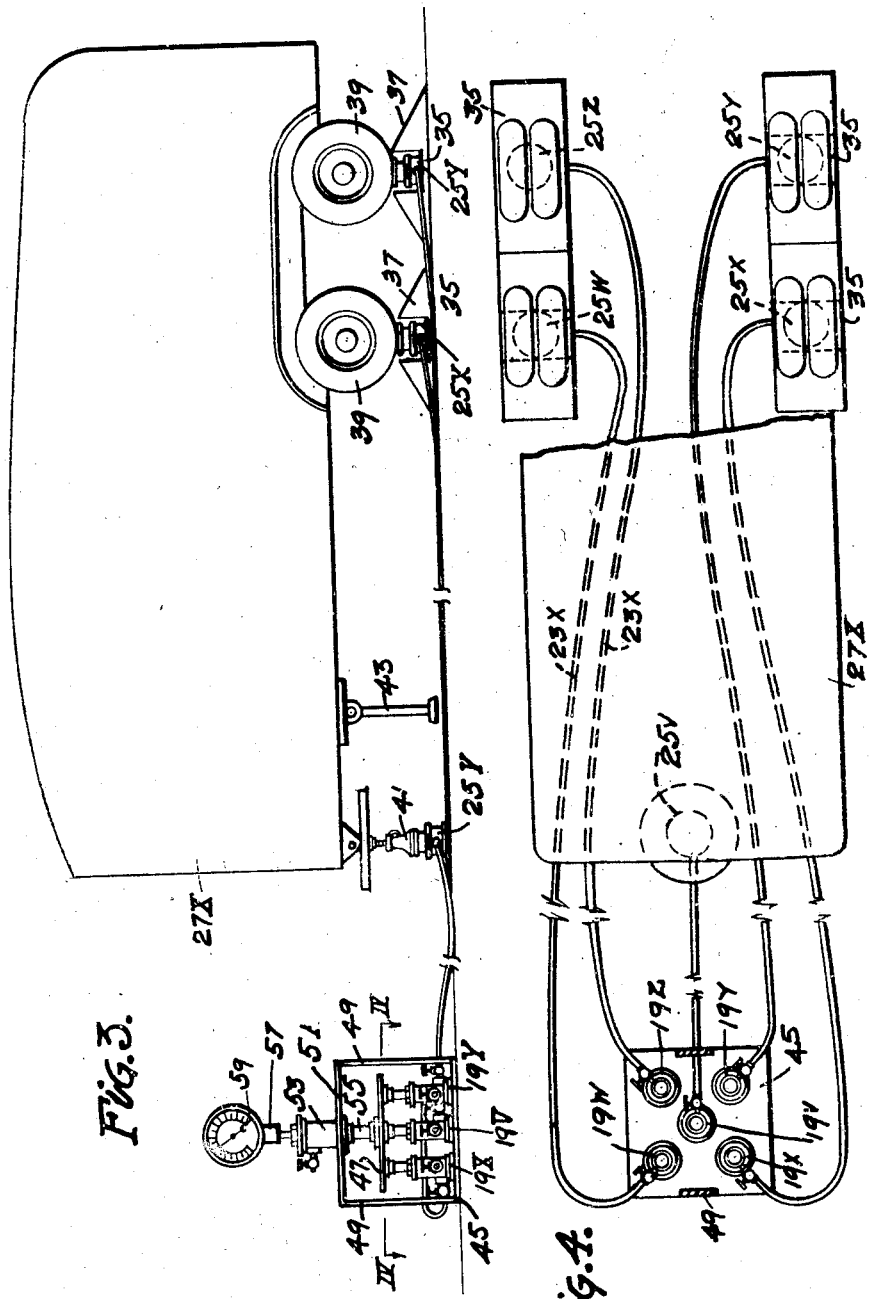

Patented Dec. 28, 1948

2,457,655

UNITED STATES PATENT OFFICE 2,457,655

HYDRAULIC SCALE MECHANISM

Robert A. Gifford, Memphis, Tenn.

Application September 25, 1943, Serial No. 503,747

8 Claims. (Cl. 265—47)

This invention relates to a hydraulic scale, and particularly to a scale in which the weight of a load is supported at convenient points on independent scale members and the weight effect on these members is hydraulically transmitted to and summarized on a responsive indicating mechanism.

In previously known devices, individual weights of various parts of a load, as the loads carried by the individual wheels of a vehicle, have been taken, these often, because of strains set up, or load shift, being inaccurate, and these weights have been added together to arrive at a total. Or otherwise, it has been usual to provide expensive mechanism of highly specialized type including a special support, as a platform on which the load is placed for weighing, and to integrate the resulting stresses on the four corners of the platform, which often in very unequally distributed loads, produce an over or under strain on parts of the mechanism and introduce inaccuracies seriously effecting the results. Also in many cases, loads are of such nature that neither the one nor the other of these instrumentalities is effective.

The objects of the present invention are:

To provide a weighing mechanism which has extreme flexibility and range of uses which includes units placeable to receive and support a load at various points, and which summarizes the weight thereof correctly;

To provide a weighing mechanism which is adapted to an almost infinite variety of loads and can care for unusual local concentrations of the load;

To provide a weighing mechanism which may in part utilize existing scale facilities; and generally to simplify and improve means and methods for weighing loads, particularly those of irregular shape and weight concentration.

The means by which the foregoing and other objects are accomplished, and the manner of their accomplishment will readily be understood from the following specification on reference to the accompanying drawings in which:

Fig. 1 is a vertical elevation of a weighing mechanism in accordance with my invention, employing a typical well known type of platform scale as a part thereof, with an irregular shaped load being weighed.

Fig. 2 is a corresponding plan view, a portion of a clamping yoke employed being cut away on the line II—II of Fig. 1 to permit showing of underlying parts in full lines.

Fig. 3 is a side elevation, showing a hydraulic type of pressure-responsive summarizing and indicating mechanism and a different type of load being weighed.

Fig. 4 is a corresponding plan view, the indicating mechanism being cut away on the line IV—IV of Fig. 3, and a portion of the load also being broken away.

These views are largely diagrammatic and are introduced as typical merely of mechanisms and uses which can be made of the device.

Referring now to the drawings in which the various parts are indicated by numerals:

11 is a typical platform type of scale having the usual base 13, load platform 15 and scale beam 17 responsive to a load on the platform. In the present device, there are placed on the platform as near as possible to the center thereof, and as close together as possible, a group of load-responsive hydraulic jacks, preferably, though not necessarily, five, 19A, 19B, 19C, 19D and 19E, being used in order that one only centrally disposed, or two, three, four, or the five, at option, may be used, and those used, whatever be their number, may be symmetrically selected with reference to the center of the platform, to promote balanced strains on the platform. Disposed over these jacks is a hold-down or abutment plate 21 having arms 22 that extend downward clear of the platform and are anchored to the base. These jacks are independently connected each respectively by a flexible hose connection 23 to related load-supporting hydraulic jacks 25A, 25B, 25C, 25D and 25E, each load-supporting jack and connected load-responsive jack comprising a hydraulic couple.

Preferably the load-supporting jacks are of much greater pressure responsive area than are the load-responsive jacks, a convenient relation being ten to one so that load on the scale platform may be similarly reduced.

All the couples are preferably of equal capacity. 27 is a load of irregular shape and weight distribution supported on three only, 25B, 25C and 25E, of the load supporting jacks, the remaining two thereof not being in this instance used. Each of the jacks 19A, etc., respectively may be supplied with a cut-off valve 29, or similar cut-off valves 31 may be provided for the jacks 25A, etc. One or the other of the load supporting, or load-responsive jacks, of each couple, preferably the load supporting jack, is also provided with a filling pipe and cut-off valve 33, through which fluid supply in the jacks may be replenished, or the heights varied to a more or less minor extent.

The details of the jacks themselves form no part of the present invention. As shown, they are intended to typify the usual cylinder, plunger type, but obviously may be, particularly insofar as the load-responsive jacks are concerned, of the well known sylphon, or diaphragm types, or otherwise.

In Figs. 3 and 4, a similar group of load responsive jacks 19V, 19W, 19X, 19Y and 19Z, and respectively related load supporting jacks 25V, 25W, 25X, 25Y and 25Z, and hose connections 23X are used, all in the example there shown being in use to support and weigh a load 27X. In this modification of the device, the load supporting jacks 25W, 25X, 25Y and 25Z are seated respectively in cradles 35 having inclined approaches 37, up which the wheels 39 of the vehicle may climb, or of a trailer, as here shown, may climb and allowed to come to rest on the tops of the jacks. At the front end of the trailer a single jack 25V is shown with the an auxiliary jack 41 interposed to raise the trailer end from the usual support 43 provided, and transfer the load to the jack 25V.

Similar cut-off and filling valves are also used, but need not be further delineated.

Load-responsive jacks 19V, etc., are disposed on a base 45 and jointly support a plate 47. Oppositely disposed arms 49 are anchored to and extend upward from the plate carrying a support 51 to which is rigidly secured an inverted hydraulic jack 53. Plunger 55 of this jack extends downward against the plate 47 and is adapted to be forced upward by action of the load-responsive jacks 19V, etc., against the opposite side of the plate. The cylinder of jack 53 is connected by a pipe 57 with a pressure-responsive gage 59 reflecting the load response of the jacks 19V, etc., and indicating the total load weight.

It will be understood that a load responsive and indicating assembly, such as delineated above, might be installed in the cab, as of an auto truck or other vehicle, and the load supporting jacks might be carried by such truck or vehicle and be available for use at any time or any place, either in weighing the truck itself or four weighing other vehicles or loads.

In using the device, such number of load supporting jacks 25A, etc., as are necessary are positioned so that the load may be conveniently placed thereon. In Figs. 1 and 2, a load of triangular shape is shown, such load conveniently requiring a three point support, and three of the load carrying cylinders are, therefore, placed to receive this load. Should the load locally be considerably heavier at one point, as at 27A, it is preferable that the load supporting jack 25C connected to the centrally disposed load responsive jack 19C be placed to receive this heavier portion of the load, this central jack under no condition being able to throw an unbalanced load on the platform 13. One of the remaining jacks, as the jack 25B connected to the load-responsive jack 19B, is placed to receive one of the other corners of the load and the jack 25E connected to the load-responsive jack 19E, diametrically opposed to the load-responsive jack 19B, is used for the other corner of the load. Should it appear that the corner of the load which was excessively heavy would be too heavy for one of the jack couples alone, use of the centrally disposed jack couple 19C, 25C would be abandoned and the two jacks 25A, 25B be placed together under such excessive portion of the load. Obviously other shifts could be made should it be desirable.

Under a rectangular or four cornered load, ordinarily the central couple 19C, 25C would not be used, and obviously if one corner of such a load be extremely heavy, two of the couples might be used under such heavy corner to more evenly distribute the load on the platform of the scale.

It will be understood of course that under ordinary conditions the very slight spread of the jacks on the platform would have substantially no unbalancing effect, but should this be feared, solution is obviously here provided.

In the form of the device shown in Figs. 3 and 4, the cradles 35 are placed so that the wheels of a trailer to be weighed may be centered over the load supporting jacks 25W, etc., and these jacks placed in the cradles. The vehicle is then pulled up by the tractor until the wheels, raised by the approaches 37, come over the top of the four jacks. Support 43 is then dropped down in the usual manner supporting the front of the trailer and the tractor disconnected, the remaining jack, preferably the jack 25V, connected to the center jack 19V, is placed thereunder and an auxiliary jack 41 used to transfer the load from the support 43 to the load supporting jack 25V. The loads individually act through the five supporting jacks on the five load-responsive jacks respectively coupled thereto, this response being transferred through the plunger 55 and the fluid in the cylinder of the jack 53 to the pressure-responsive gage 59 on which the load is indicated.

It will be understood that the showing of five jack couples is suggestive only and that a less or greater number may be used without departing from my invention, and that except when specifically set out in a claim, no such number limitation is intended.

I claim:

1. A weighing mechanism, comprising a platform scale, including a base, a load-responsive platform, a scale beam carried by and above said base, and means operatively coupling said platform and said scale beam, a plurality of load-responsive hydraulic jacks in a compact group, centrally disposed and seated on said platform, abutment means disposed against the upper ends of said jacks, and anchored to said base, an identical plurality of independently shiftable and usable load supporting hydraulic jacks, and flexible hose connections each respectively conecting a said load-responsive jack and a said load-supporting jack, and establishing a passageway for fluid flow therebetween, while maintaining freedom of shift and placing of said load-supporting jack.

2. A weighing mechanism, comprising a scale, including a base, a plate member, a weight indicating pressure responsive gage and an inverted hydraulic jack above said member, said jack having its cylinder in fluid communication with said gage, and its plunger against said plate member, means carried by said base rigidly supporting said jack cylinder, a compact group of load-responsive hydraulic jacks seated on said base and having their upper ends underlying and supporting said plate member, an identical number of load-supporting hydraulic jacks, and flexible hose connections, each respectively connecting a said load-responsive jack and a said load-supporting jack, and establishing a passageway for fluid flow therebetween while maintaining freedom of shift and placing of said load-supporting jack.

3. A weighing mechanism, comprising a platform scale, including a base, a pressure-responsive platform, a scale beam carried by and above said base, and means operatively coupling said platform and said scale beam, a plurality of pressure-responsive hydraulic jacks in a compact group, centrally disposed and seated on said platform, abutment means disposed against the upper ends of said jacks, and anchored to said base, an identical plurality of independently shiftable and usable load supporting hydraulic jacks, and flexible hose connections each respectively connecting a said pressure-responsive jack and a said load-supporting jack, and establishing a passage-way for fluid flow therebetween, while maintaining freedom of shift and placing of said load-supporting jack, said groups of pressure-responsive jacks, comprising one jack seated in the center of said platform, and a plurality of pairs of jacks, the jacks of each said pair respectively being diametrically opposed with reference to said central jack and at equal distances therefrom.

4. In a hydraulic weighing device; scale means, including an abutment, a load responsive plate spaced therefrom, and scale mechanism coupled to said plate to indicate pressures thereon; a plurality of units, each unit comprising a liquid filled hydraulic cylinder-piston assembly adapted to receive a load placed thereon for weighing, a hydraulic cylinder-piston assembly responsive to liquid flow thereinto, and an elongated flexible tube interconnecting said assemblies to establish flow connection therebetween and freedom of shift of said weight receiving assembly; said weight receiving assemblies being individually shiftable to establish desired group patterns, as to conform to the shape, size and weight concentration of the article instantly to be weighed and the number of said units used being optional; said responsive assemblies being arranged in a group to bear against said abutment and load responsive plate, said group comprising a first assembly centrally disposed with respect to said load responsive plate, and a plurality of pairs of assemblies, the assemblies of each said pair being diametrically opposed with relation to said first assembly and at equal distances therefrom, whereby symmetrical arrangement of said load responsive assemblies with respect to said plate may be maintained irrespective of the number of said units used.

5. In a hydraulic weighing device; scale means, including an abutment, a load responsive member spaced therefrom, and scale mechanism coupled to said member to indicate pressures thereon; a plurality of units, each unit comprising a liquid filled hydraulic cylinder-piston assembly adapted to receive a load placed thereon for weighing, a hydraulic cylinder-piston assembly responsive to liquid flow thereinto, and an elongated flexible tube interconnecting said assemblies to establish flow connection therebetween and freedom of shifts of said weight receiving assembly; said weight receiving assemblies being individually shiftable to establish desired group patterns, as to conform to the shape, size and weight concentration of the article instantly to be weighed and the number of said units used being optional; said responsive assemblies being arranged in a group to bear against said abutment and said load responsive member, said group comprising a first assembly centrally disposed with respect to said load responsive member, and a plurality of pairs of assemblies, the assemblies of each said pair being diametrically opposed with relation to said first assembly and at equal distances therefrom, whereby symmetrical arrangement of said load responsive assemblies with respect to said member may be maintained irrespective of the number of said units used.

6. In a hydraulic weighing device; scale means, including an abutment, a load responsive member spaced therefrom, and scale mechanism coupled to said member to indicate pressures thereon; a plurality of units, each unit comprising a liquid filled hydraulic cylinder-piston assembly adapted to receive a load placed thereon for weighing, a hydraulic cylinder-piston assembly responsive to liquid flow thereinto, an elongated flexible tube interconnecting said assemblies to establish flow connection therebetween and freedom of shift of said weight receiving assembly; and means for cutting off flow through said tube; said weight receiving assemblies being individually shiftable to establish desired group patterns, as to conform to the shape, size and weight concentration of the article instantly to be weighed and the number of said units used being optional; said responsive assemblies being arranged in a group to bear against said abutment and said load responsive member, said group comprising a first assembly centrally disposed with respect to said load responsive member and a plurality of pairs of assemblies, the assemblies of each said pair being diametrically opposed with relation to said first assembly and at equal distances therefrom, whereby symmetrical arrangement of said load responsive assemblies with respect to said member may be maintained irrespective of the number of said units used.

7. A weighing device comprising an abutment, liquid filled load responsive units and weight indicating means; each said unit including a load-supporting hydraulic cylinder-piston assembly, a load-responsive hydraulic cylinder-piston assembly, and a flexible tube interconnecting said assemblies; said load supporting assemblies being selectively usable, and independently shiftable to establish a desired load support pattern conforming to the shape, size, and weight concentration of the article to be weighed; said weight indicating means including a pressure responsive plate actuatable by said load-responsive assemblies in response to load created pressures in said load-supporting assemblies; said load-responsive assemblies being arranged in a group to bear against said abutment and said pressure responsive plate, said group comprising a first assembly centrally disposed with respect to said plate, and a plurality of pairs of assemblies, the assemblies of each said pair being diametrically opposed with relation to said first assembly and at equal distances therefrom whereby symmetrical arrangement of said load-responsive assemblies with respect to said plate may be maintained irrespective of the number of said units used.

8. A weighing device comprising an abutment, liquid filled load responsive units and weight indicating means; each said unit including a load-supporting hydraulic cylinder-piston assembly, a load-responsive hydraulic cylinder-piston assembly, a flexible tube interconnecting said assemblies, and means for cutting off flow through said tube; said load supporting assemblies being selectively usable, and independently shiftable to establish a desired load support pattern conforming to the shape, size, and weight concentration of the article to be weighed; said weight indicating means including a pressure responsive plate actuatable by said load-responsive assemblies in response to load created pressures in said load-supporting assemblies; said load-responsive assemblies being arranged in a group to bear against said abutment and said pressure responsive plate, said group comprising a first assembly centrally disposed with respect to said plate and a plurality of pairs of assemblies, the assemblies of each said pair being diametrically opposed with relation to said first assembly and at equal distances therefrom, whereby symmetrical arrangement of said load responsive assemblies with respect to said plate may be maintained irrespective of the number of said units used.

ROBERT A. GIFFORD.

REFERENCES CITED

The following references are of record in the file of this patent:

UNITED STATES PATENTS

| Number | Name | Date |
|---|---|---|
| 439,215 | Wanamaker | Oct. 28, 1890 |
| 566,698 | Raab | Aug. 25, 1896 |
| 1,147,128 | Troll | July 20, 1915 |
| 1,354,447 | Troll | Sept. 28, 1920 |
| 1,458,920 | Troll | June 12, 1923 |
| 1,907,208 | Lebel | May 2, 1933 |
| 1,971,388 | Scruby | Aug. 28, 1934 |
| 2,020,307 | Fitch | Nov. 12, 1935 |
| 2,093,141 | Sonsalla | Sept. 14, 1937 |
| 2,109,460 | Brasher | Mar. 1, 1938 |
| 2,125,483 | Blanchard | Aug. 2, 1938 |
| 2,279,912 | Bohannan | Apr. 14, 1942 |
| 2,314,011 | Maurer | Mar. 16, 1943 |
| 2,349,228 | Wolff | May 16, 1944 |

FOREIGN PATENTS

| Number | Country | Date |
|---|---|---|
| 574,901 | France | Apr. 9, 1924 |
| 684,307 | Germany | Nov. 25, 1938 |